United States Patent [19]

Giglioli

[11] 4,095,250

[45] June 13, 1978

[54] STEERABLE CAMERA CARRIAGE

[76] Inventor: Frederick G. Giglioli, 400 S. Sunkist, Anaheim, Calif. 92806

[21] Appl. No.: 678,215

[22] Filed: Apr. 19, 1976

[51] Int. Cl.² ............................................ G03B 17/00
[52] U.S. Cl. ..................................... 354/293; 354/81; 352/243; 248/129; 362/11
[58] Field of Search ................... 354/75, 76, 81, 293, 354/294; 352/243; 240/2 R, 1.3; 248/129; 280/263

[56] References Cited

U.S. PATENT DOCUMENTS

| 2,200,736 | 5/1940 | Bedford et al. | 352/243 |
| 2,599,269 | 6/1952 | Markle | 354/81 |
| 2,661,672 | 12/1953 | Fairbanks | 354/81 |
| 3,559,552 | 2/1971 | Weitzer | 352/242 |

FOREIGN PATENT DOCUMENTS 616,414  2/1961  Italy .................................. 354/293

Primary Examiner—L. T. Hix
Assistant Examiner—Alan Mathews

[57] ABSTRACT

A steerable camera carriage comprises a triangular base plate having an upright shaft rotatably supported at each of its corners. Each shaft has a support wheel for the carriage on the bottom thereof and camera equipment mounted on the upper end thereof. An upright post provided with a steering wheel is rotatably mounted on the center of said base plate. A sprocket on the lower end of the post is connected by an endless chain to a sprocket on the lower end of each of the shafts. With such an arrangement, the steering wheel in addition to serving to control the direction of movement of the carriage provides for controlling the angular orientation of the cameras to facilitate the taking of pictures by a photographer.

7 Claims, 10 Drawing Figures

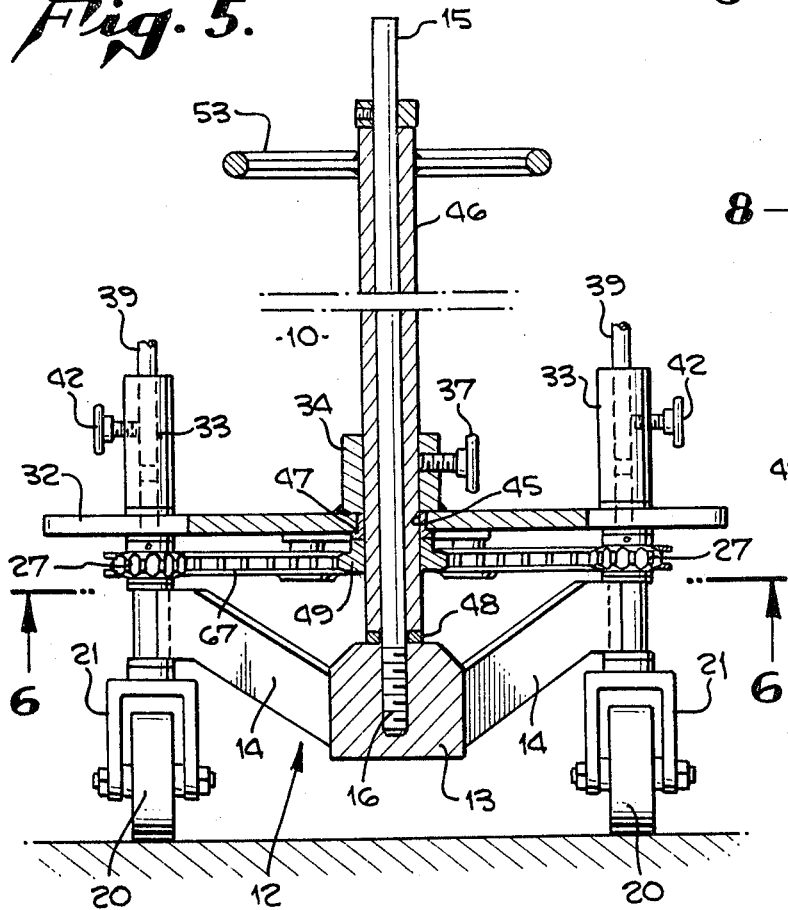
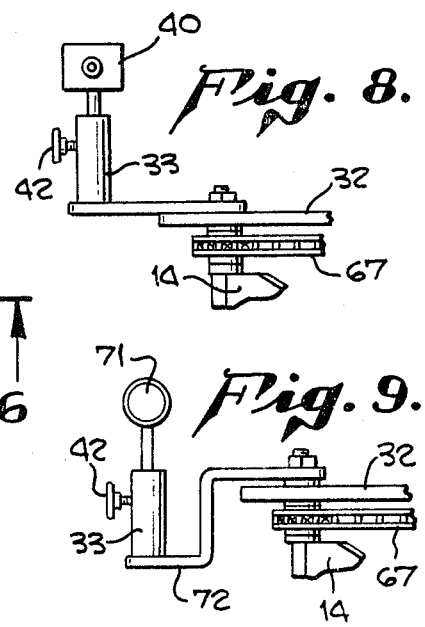
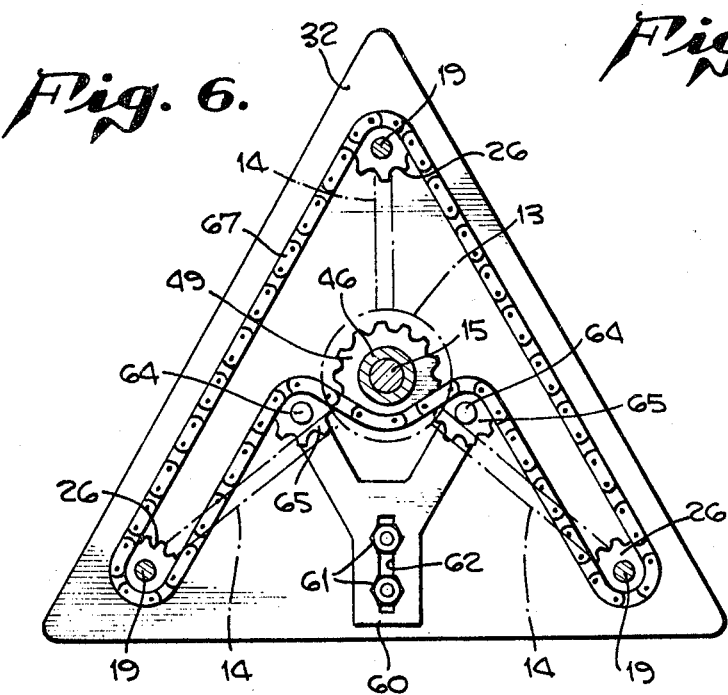
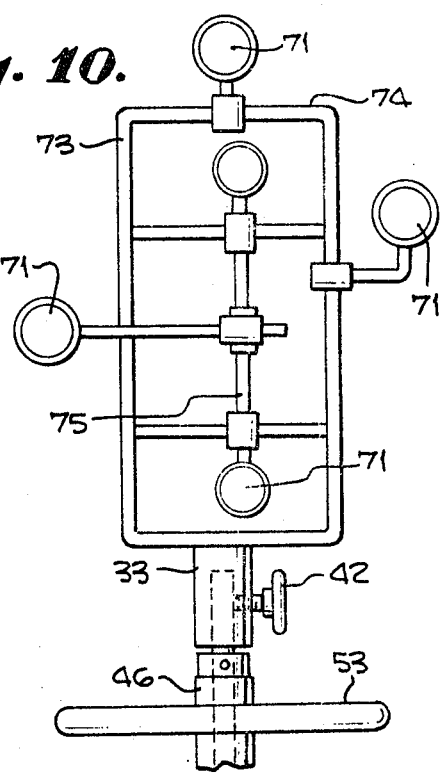

STEERABLE CAMERA CARRIAGE

This invention relates to camera handling equipment and more particularly to a steerable camera carriage.

When a photographer arranges to photograph a subject he ordinarily sets up a tripod with a camera mounted thereon at the site of the subject and then adjusts the height of the tripod and the angular orientation of the camera such that it is properly directed to obtain the desired pictures. Then, when he wants to photograph the subject at a different angle or photograph another subject having a different location, he collapses the tripod and sets it up again at a new location at the same time adjusting the elevation of the camera and oftentimes even replacing the camera with another more suited for the purpose.

The steerable camera carriage of the present invention simplifies the taking of pictures by the photographer by not only making it easier for him to move the necessary cameras about but also in controlling the orientation of the cameras once the carriage is positioned so as to facilitate the rapid photographing of one or more subjects whether in the studio or on location.

Accordingly, one of the objects of the present invention is to provide a simple, low cost, steerable camera carriage for use by a photographer in photographing a subject or subjects.

Another object of the present invention is to provide a steerable camera carriage on which several cameras can be set up for immediate use in photographing one or more subjects.

Still another object of the present invention is to provide a camera carriage having a plurality of cameras mounted thereon which can be simply controlled as to their angular orientation by use of the steering wheel normally provided on the carriage for controlling its guidance.

With these and other objects and features of advantage in view, the invention consists of the construction, arrangement and combination of the various parts of the device, whereby the objects contemplated are attained as hereinafter more fully set forth, pointed out in the claims and illustrated in the accompanying drawings.

DRAWING SUMMARY

FIG. 5 is a vertical sectional view as taken along lines 5—5 of FIG. 2;

FIG. 6 is a bottom plane view of the camera carriage as taken along line 6—6 of FIG. 5;

FIGS. 7 and 8 illustrate a camera being mounted on a wheel shaft by use of a horizontally extending arm;

FIG. 9 is a modified form of the arm shown in FIG. 8; and

FIG. 10 shows a frame for spotlights attached on the central steering post.

Figure 1:
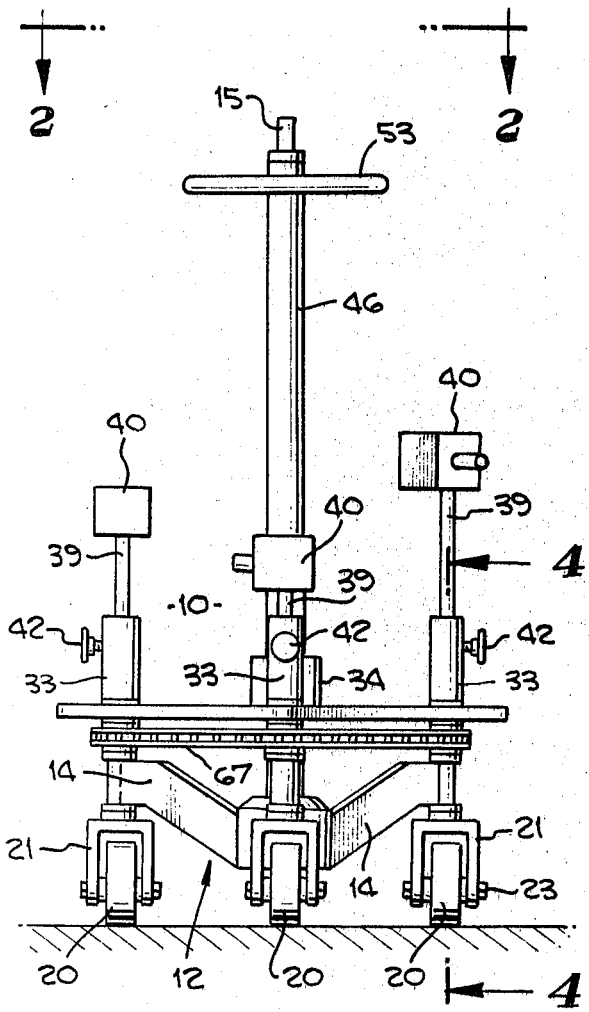
FIG. 1 is a front elevation view of the camera carriage of the present invention.

Referring to FIGS. 1 and 5 of the drawings, the steerable camera carriage 10 of the present invention includes a base frame 12 having three spaced arms 14 radiating from a central support 13. Extending upwardly from the center of the frame 12 is a rod 15 whose lower end 16 is threadably engaged in an opening on the central support. A steering post in the form of a tube 46 is slidably positioned over the rod 15 with the lower end thereof contacting an anti-friction washer 48 on the top of the central support 13. A steering wheel 53 is attached to the upper end of the tube 46. The tube 46 has a sprocket 49 attached thereto at a level just below the top of the outer ends of the arms of base frame 12. A triangular base plate 32 having a central opening 45 with a sleeve bearing 47 secured therein is positioned above the frame 12 with its bearing 47 resting above the sprocket 49 and with the tube 46 extending up through the bearing 47 and through a collar 34 attached to the top of base plate. A set screw 37 in the collar 34 is used to lock the tube 46 relative to the base plate.

Figure 4:
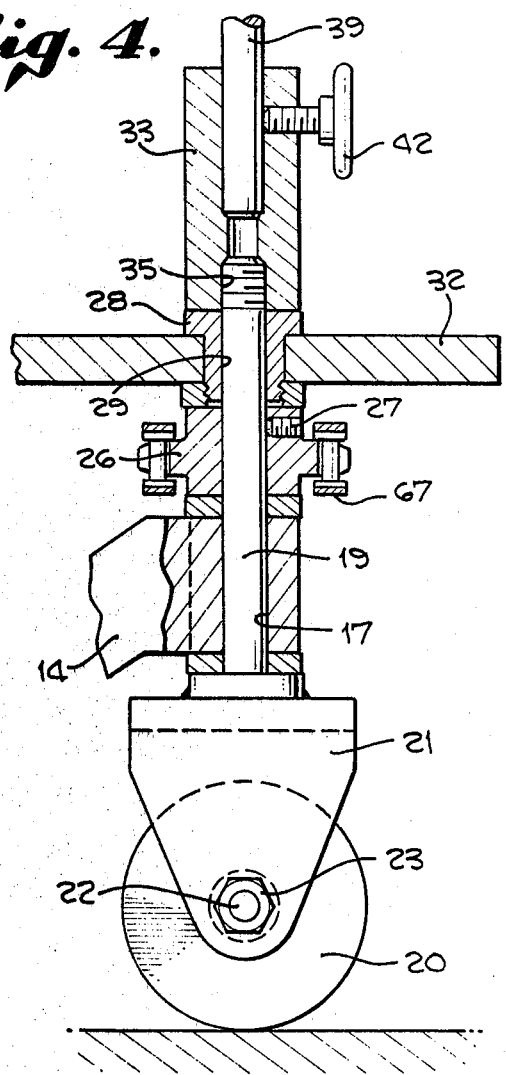
FIG. 4 is a vertical sectional view as taken along line 4—4 of FIG. 1.

The outer ends of each of the three spaced arms 14 on the frame 12 are provided with vertical openings 17. As shown in FIG. 4, extending through and freely rotatable in each vertical opening 17 is an upright wheel shaft 19 having a fork 21 attached on the bottom thereof. Positioned within each fork 21 is a support wheel 20 having an axle 22 whose ends are journaled in openings in the sides of the fork 21 and held by nuts 23. A wheel sprocket is keyed by set screws 27 to the shaft 19 above the frame arm 14. The upper end of the shaft 19 then passes through a sleeve bearing 28 held in an opening 29 in a corner of the triangular base plate 32. A coupler 33 having a threaded bottom opening 35 is then engaged onto the upper end of the upright shaft 19 which extends above the base plate 32. A post 39 having camera equipment such as a camera 40 supported on the upper end thereof has its lower end slidably inserted into the upper end of the coupler 33 and held by the set screw 42.

It should now be clear that at each corner on the triangular base plate 32, an upright shaft such as a shaft 19 is journaled for rotation about its axis in a bearing 28 and each shaft has attached thereto a fork 21, a wheel axle 22, a support wheel 20, a sprocket 26 and a camera 40.

As shown in FIG. 6, a Y-shaped tension plate 60 is attached beneath the rear portion of the base plate 32 by a pair of bolts 61 passing through a slot 62 in the plate 60. Journaled on stub shafts 64 on the ends of the arms of Y-plate 60 are a pair of idler sprockets 65 which are respectively disposed on either side of the central sprocket 49. An endless sprocket chain 67 runs about the three wheel sprockets 26 mounted on the shaft 19 below the respective corners of the triangular base plate 32 and is held by the idler sprockets 65 to engage the central sprocket 49. The tension plate 60 is adjusted along its slot 62 to take up any slack in the chain 67.

There are times when the camera equipment to be mounted on the upper ends of the wheel shafts 19, such as the cameras 40, may be too bulky or cannot be placed at a desired level. Thus as shown in FIGS. 7 and 8 a horizontal arm 70 having a camera mounted on its outer end may be attached by securing its inner end on the upper end of the wheel shaft 19 by use of a nut 69. As shown in FIG. 9, the horizontal arm 72 may have a vertical offset on its outer end and a spotlight 71 may be mounted thereon instead of a camera 40. Furthermore it may be desirable to attach a spotlight frame support 73 to the shaft 19, the control rod or the tube 46. Such support 73 may have horizontal members 74 and vertical members 75 thereon to which spotlights 71 may be attached.

Figure 2:
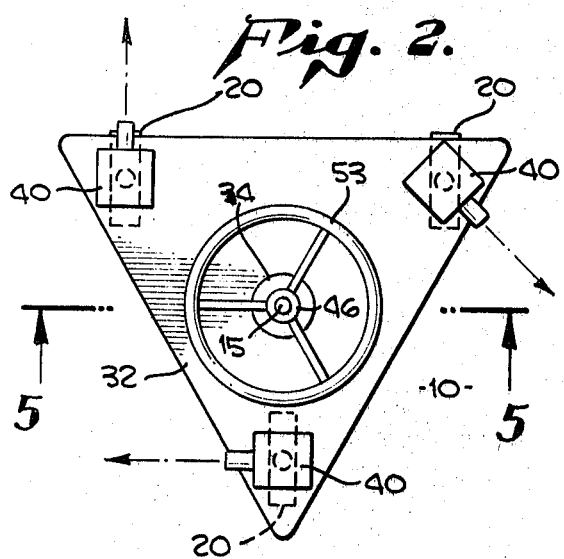
FIG. 2 is a top plane view of the camera carriage shown in FIG. 1.
Figure 3:
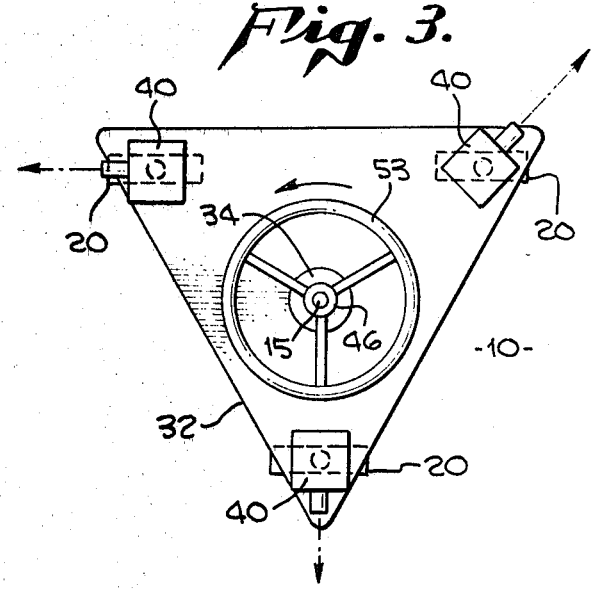
FIG. 3 is a top plane view similar to FIG. 2 but showing the cameras mounted thereon angularly repositioned as a result of rotating the steering wheel.

It should now be evident that when the steering wheel 53 is manually rotated, the tube 46 with the control sprocket 49 fixed thereto rotates on its axis relative to its base plate 32 causing each of the shafts 19 journaled at the corners of the base plate 32, and having cameras 40 mounted thereon, to rotate on their respective axes a like amount. Thus, by observing a particular camera 40 on the carriage 10 which the photographer is interested in using at any given time, the steering wheel 53 can be rotated such that the camera is directed to view the subject to be photographed. Then, after taking the desired pictures, the photographer can by again rotating the steering wheel 53 and by watching either the same camera 40, or a different one, direct it to view the subject to be photographed. For instance, as illustrated in FIGS. 2 and 3, should the action call for a particular one of the cameras 40 taking a picture in a given direction and then later for the same camera taking a picture in a transverse direction 90° from the first direction, the photographer can by merely rotating the steering wheel 53 a quarter turn in a counterclockwise direction position the camera to photograph the latter subject. Any of the other cameras on the carriage could, of course, be used at each position of the steering wheel.

It should now be understood that by proper choice of the type of cameras 40 and their elevation as provided at each of the corners of the base plate 32 at the initial setup on the carriage 10, the photographer can make available any of the cameras that he needs for taking the various photographs or takes of the subject or subjects at a studio or a particular location.

It should now be clear that the purpose of the steering wheel 53 on the carriage 10 is not merely to control the movement of the carriage about at a particular location. The steering wheel 53 has a further purpose in that, once the carriage 10 has been positioned relative to the subject or subjects to be photographed, it provides a positive steering control capable of rotating the cameras 40 supported above each of the corners of the base plate 32 so that one or all are properly oriented to enable the taking of the desired views of the subject being photographed.

The steerable camera carriage 10 of the present invention is especially useful when the cameras 40 mounted on the shafts 19 above each of the corners of the base plate 32 are movie cameras. This is particularly of value when the action to be taken is predetermined so that the use of the cameras can be preprogrammed. For such use, the angular setting of each of the cameras 40 relative to the base plate 32 and to each other is set in accordance with the program and fixed by fastening the set screws on each of the couplers 33. The carriage 10 is then moved on its wheels 20 using the steering wheel 53 for guidance to the location of the action which may be a crowd scene or a number of different settings. Now then, when one camera 10 is lined by use of the steering wheel 53 to view its portion of the action the others are necessarily lined to view their portion of the action.

With such a setup of movie cameras on the carriage 10, when it is desired to "pan" the various viewing areas being shot, the steering wheel 53 need be merely slowly rotated resulting in all three cameras 40 being moved to simultaneously scan their respective portions of the viewing area. Likewise, by properly programming the action, each of the cameras once being set on the carriage can be simultaneously rotated to pick up a changing take on each of three sets being simultaneously photographed, for example. Still further the equipment can be programmed such that the cameras have different angular settings in anticipation of the action as it progresses thus making it possible by use of the steering wheel 53 for each of the preset cameras 40 to be oriented to successively or simultaneously pick up the action as it occurs.

While in order to comply with the statutes the invention has been described in language more or less specific as to the structural features, it is to be understood that the invention is not limited to the specific features shown but that the means and construction herein disclosed comprise a preferred form of putting the invention into effect and the invention is therefore claimed in any of its forms or modifications within the legitimate and valid scope of the appended claims.

What is claimed is:

1. A steerable camera carriage comprising:
a base member having bearing openings at the corners thereof and a bearing opening intermediate the corners thereof;
an upright shaft journaled in each of said corner bearing openings for rotation about a vertical axis;
each of said shafts having a support wheel rotatably mounted on the lower end thereof and a wheel sprocket disposed thereon below said base member;
support means for individual camera equipment mounted on the upper end of each of said shafts so as to rotate therewith about the vertical axis thereof;
a steering post journaled in said intermediate bearing opening for rotation about a vertical axis;
said steering post having a control sprocket disposed thereon below said base member; and
an endless chain for interlocking the control sprocket and each of the wheel sprockets;
the rotation of said steering post being operable to drive said chain to rotate each of said shafts about its vertical axis and thereby control the angular displacement of the support means for the individual camera equipment mounted on each of said shafts while said carriage is maintained in a given position.

2. A steerable camera carriage comprising:
a base frame having bearing openings at the corners thereof and a bearing opening intermediate the corners thereof;
an upright shaft journaled on each of said corner bearing openings for rotation about a vertical axis;
a support wheel for said base frame rotatably mounted on the lower end of each of said shafts;
a wheel sprocket on each of said shafts;
a steering post journaled in said intermediate bearing opening for rotation about a vertical axis;
a conrol sprocket on said steering post;
an endless chain for interlocking the control sprocket and each of the wheel sprockets; and
a support means for camera equipment mounted on each of said shafts so as to be rotatably adjustable about the vertical axis thereof and including locking means for locking it in position on said shaft;
whereby the support means for camera equipment can be selectively locked on their respective shafts in different relative positions of rotation, and thereafter rotated together while maintaining their relative positions.

3. The invention in accordance with claim 2 wherein said base frame is generally triangular in shape.

4. The invention in accordance with claim 2 wherein said support means for camera equipment is a horizontal arm whose inner end is attached to said shaft.

5. A steerable camera carriage comprising:
a triangular base member;
an upright shaft rotatably supported on each corner of said base member for rotation about a vertical axis;
a support wheel for the base member rotatably mounted on the lower end of each said shaft;
a support element for individual camera equipment mounted on each said shaft so as to rotate therewith about the vertical axis thereof;
an upright steering post rotatably supported on said base member intermediate the corners thereof; and
means for interlocking said steering post and said shafts so that rotation of the steering post results in the rotation of said shafts;
whereby rotation of said steering post provides for steering the support wheels while moving said carriage from one place to another and also provides for controlling the angular orientation of the support elements for the individual camera equipment mounted on each said shaft while said carrige is maintained in a given position.

6. The invention in accordance with claim 5 wherein said camera equipment comprises camera.

7. The invention in accordance with claim 5 wherein said camera equipment on at least one of said shafts comprises a spotlight.

* * * * *